UNITED STATES PATENT OFFICE.

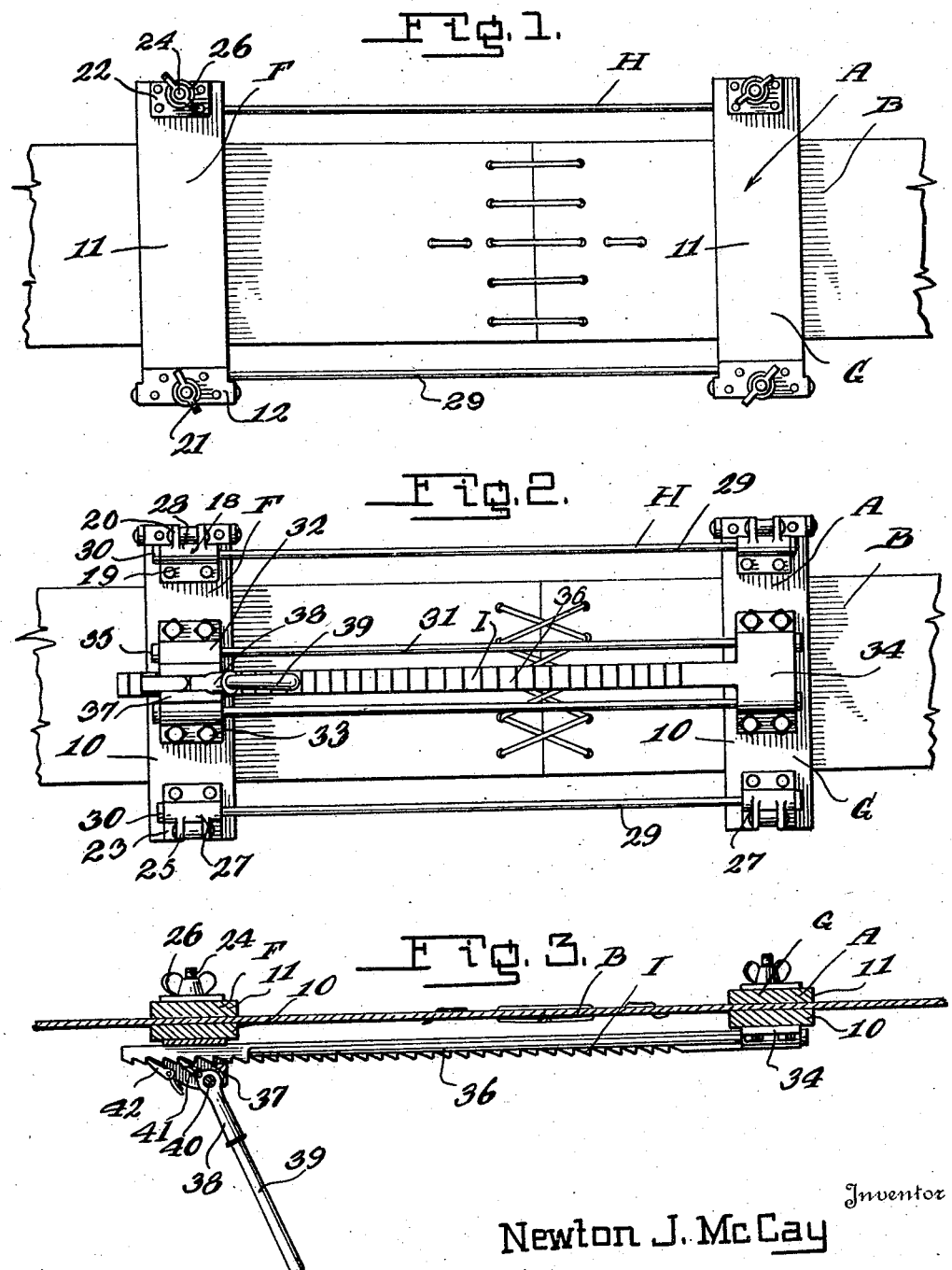

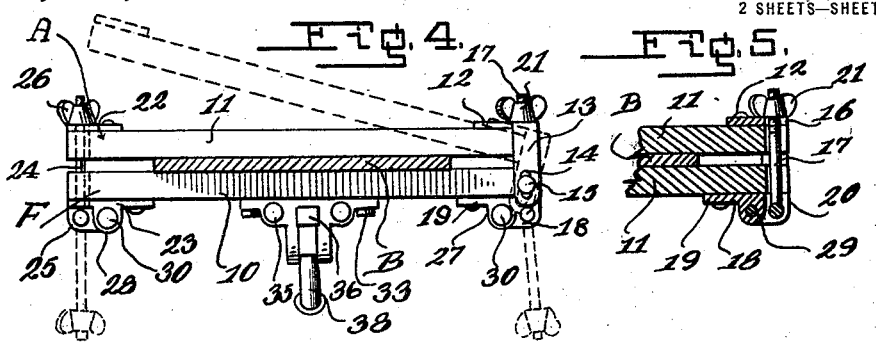
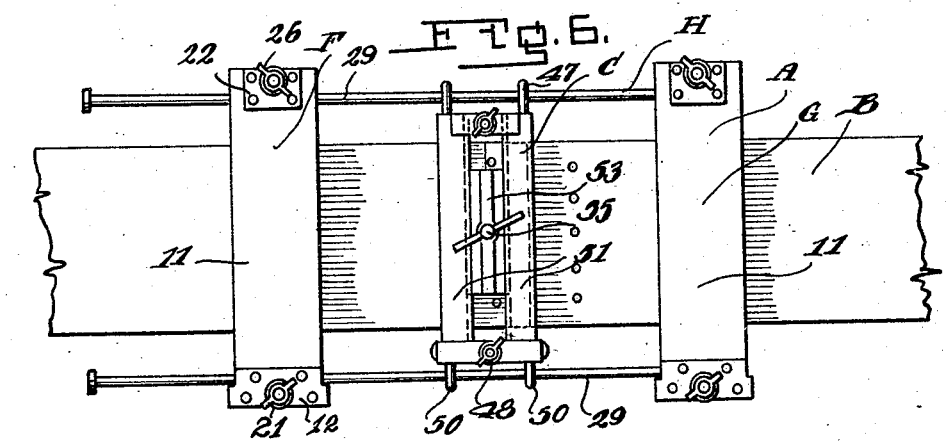
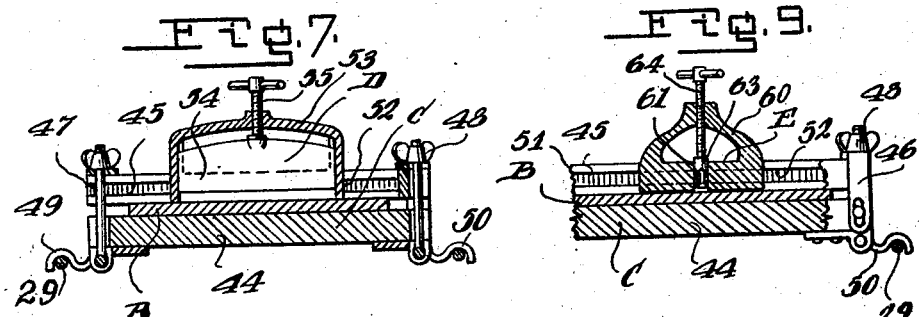
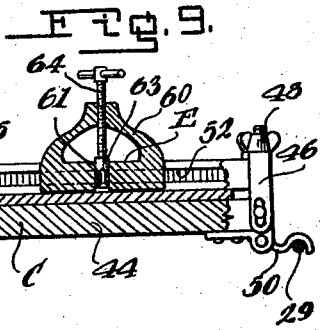
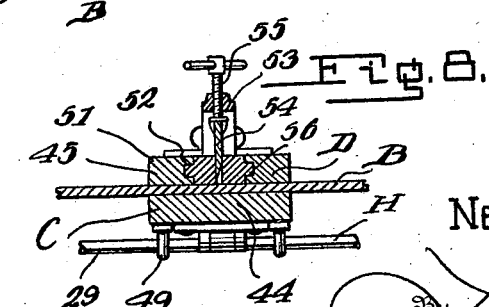

NEWTON J. McCAY, OF COALINGA, CALIFORNIA.

HEAVY-DUTY BELT ADJUSTER.

1,414,428. Specification of Letters Patent. Patented May 2, 1922.

Application filed February 17, 1921. Serial No. 445,804.

*To all whom it may concern:*

Be it known that I, NEWTON J. McCAY, a citizen of the United States, residing at Coalinga, in the county of Fresno and State of California, have invented certain new and useful Improvements in Heavy-Duty Belt Adjusters, of which the following is a specification.

This invention relates to belt tools and the primary object of the invention is to provide an improved tool for permitting the tightening or loosening of drive or power transmitting belts and the lacing thereof without necessitating the removal of the belts from their pulleys or drums.

It is often necessary, due to stretching or contracting of belts, caused by climatic changes, to shorten or lengthen the belts and considerable time and labor is involved in doing this when the belts are large and heavy. This is especially true in the machines used for oil well work and when a belt is required to be lengthened or shortened, the services of three or four men are required to remove or place the belt on the drive pulley and band wheel. It is therefore, a prime object of the invention to provide an improved means for engaging the belt while in position, which will permit the cutting of the belt to shorten the same, or the insertion of a piece of belt to lengthen the same, the punching of new holes for the lace, and the new lacing of the belt.

A further object of the invention is to provide an improved belt tool embodying a pair of adjustable clamps, for engaging the belt at spaced points, means for adjusting the clamps toward or away from each other, so as to lengthen or shorten the belt, and means carried by the belt tool for cutting the belt transversely, and means for punching new lace holes in the belt, the clamps holding the belt ends in position, so as to permit the convenient lacing thereof.

A still further object of the invention is to provide an improved means carried by the belt tool for receiving a belt cutter or a belt punching tool, the improved means permitting the belt cutter or belt puncher to be adjusted transversely and longitudinally of the belt.

A still further object of the invention is to provide an improved belt tool of the above character, which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which:

Figure 1 is a plan view of the improved belt tool showing the same in position on a belt.

Figure 2 is a bottom plan view of the improved belt tool showing the same in position on a belt.

Figure 3 is a vertical longitudinal sectional view through the improved belt tool, showing the same in position on a belt, the belt being also shown in section.

Figure 4 is an end elevation of the improved belt tool, showing the same in position on a belt, the belt being shown in section.

Figure 5 is a fragmentary detail transverse section through one of the clamps of the improved belt tool showing the means of adjustably and hingedly connecting the jaws of the clamps together.

Figure 6 is a top plan view of the improved tool showing the same in position on a belt, with the belt tool cutter associated therewith.

Figure 7 is a vertical transverse section through the improved tool and belt cutter.

Figure 8 is a fragmentary longitudinal section through the improved tool with the belt cutter thereon, and Figure 9 is a view similar to Figure 7 showing a belt puncher associated with the belt tool instead of the belt cutting blade.

Referring to the drawings in detail, wherein similar reference characters designate corresponding parts throughout the several views, the letter A indicates the improved belt tool, B the belt, and C the frame for association with the tool for supporting the cutter and puncher D and E respectively.

The improved tool A includes a pair of clamps F and G for engaging the belt B at spaced points, a means H for slidably connecting the clamps together, and the means I for adjusting the clamps toward or away from each other.

The clamps F and G are constructed, substantially the same, and each includes an upper and lower jaw 11 and 10. These jaws are arranged in superposed relation and are of a substantially rectangular configuration and have flat bearing faces for engaging the belt. The bearing faces if so desired, of the jaws 10 and 11 may be provided with friction pads for engaging the belt, or the faces may be serrated so as to prevent slipping thereof on the belt. The jaws 10 and 11 are each connected together at one end by means of a novel type of hinged connection which will now be described. Each of the upper jaws 11 has secured thereto a flat metallic plate 12 the opposite edges of which are provided with depending ears 13. These ears 13 embrace the opposite sides of the jaws 10 and are slotted as at 14 for the reception of the headed pivot pins 15 carried by the jaws 10. This connection not only permits the jaws to be swung in relation to each other, but also permits the jaws to be adjusted toward and away from each other. The plate 12 at its transverse center is provided with an inwardly extending notch 16, which is adapted to receive the threaded adjusting bolt 17 which is pivotally carried by a lower casting or bracket 18 which will also be now described. This casting or bracket 18 includes a base plate 19 which is riveted or otherwise secured to the lower jaw 10 and this plate is provided with a pair of spaced ears 20 between which the lower end of the adjusting bolt 17 extends. The lower end of the bolt is connected to the ears 20 so as to permit the free swinging movement thereof in any preferred manner. The upper end of the bolt 17 receives a wing nut 21, which is adapted to engage the plate 12 and acts as means for adjusting one end of the jaws toward the other. The opposite free end of the jaws 10 and 11 are connected together by means of a bolt and adjusting nut, which will now be described. The means for connecting the opposite ends of the jaws 10 and 11 together consists of an upper plate 22 and a lower plate or casting 23. The upper plate 22 and the lower plate 23 are bolted or otherwise secured to the jaws 10 and 11, and the upper plate 22 is provided with an inwardly extending notch for the reception of the upper end of the adjusting bolt 24. The lower plate 23 is provided with a pair of ears 25 for the reception of the lower end of the bolt 24 and the bolt 24 is pivoted or otherwise secured to the ears 25. The bolt 24 also has threaded on its upper end the winged nut 26, by means of which the jaws may be adjusted toward and away from each other. The brackets or castings 18 and 23 are provided with aligned guide sleeves 28 and 27, and these guide sleeves are adapted to slidably receive the guide rods 29 which form a portion of the means H for slidably connecting the clamps F and G together. The rods 29 are provided with heads 30, which serve to limit the outward movement of the clamps in relation to each other beyond a predetermined point and prevent displacement of the clamps from off of said rods.

Guide rods 31 are also provided for the clamps F and G and are arranged adjacent to the longitudinal center of the belt B and have their terminals slidably mounted in guide sleeves 32 carried by the opposite sides of brackets or castings 33 and 34 secured respectively to the clamp F and the clamp G. These brackets or casting 33 and 34 are bolted or otherwise secured to the lower jaw 10 of each of the clamps.

The rods 31 are also provided with heads 35 which also serve as means for preventing movement of the clamps F and G beyond a predetermined point in relation to each other. The brackets or castings 33 and 34 also form a part of the adjusting means I for moving the clamps F and G toward or away each other, and this adjusting means I will now be described.

The adjusting means I includes the longitudinally extending rack bar 36, which may be formed integral with the bracket or casting 34 or secured thereto in any preferred manner. This rack bar 36 extends outwardly from the casting 34 toward the casting 33, which is provided with a centrally disposed guide way 37 for the reception of the same. This casting 33 pivotally supports a lever 38 which can be provided with a suitable operating handle 39. This lever is mounted upon a suitable pivot pin 40 which extends through the casting 33 and the inner end of the lever has pivotally connected thereto a spring pressed pawl 41 which extends into the guide way 37 and is adapted to engage the teeth of the rack bar 36. The casing also carries a pivoted spring pressed pawl 42, which can be manually operated when so desired. This pawl is also adapted to engage the teeth of the rack bar and it can be seen that when the lever is moved in one direction, the rack bar can be moved in a step by step movement, thus feeding the clamps toward or away from each other.

The frame C which is adapted to have associated therewith the cutting knife D or punch E is so arranged as to slidably and removably fit upon the guide rods 29 and this frame includes a pair of jaws 44 and 45 which are adapted to engage the upper and lower surfaces of the belt B intermediate the clamps F and G. This frame C extends in parallel relation to the clamps F and G and the jaws 44 and 45 thereof are pivotally connected to one another at one end by means of the hinge 46 which is constructed in the same manner as the hinged connection of the jaws 10 and 11 of the clamps F and G. Thus it can be seen that the jaws 44 and 45 can also be adjusted toward and away from each other as well as swung in relation to each other. These jaws can be moved toward and away from each other by the nuts and bolts 47 and 48 which are associated with the frame C in the same manner as the adjusting means of the jaws 10 and 11. The brackets which support the bolts 47 and 48 also carry outwardly extending guides 49 and 50, which are adapted to slidably rest upon the guide rods 29. The upper jaw 45 of the frame C includes a pair of spaced plates 51, the inner surfaces of which are provided with guide grooves 52 for the reception of the belt cutter D or the punch E, which will be hereinafter more fully described.

The belt cutter D comprises a frame 53, which supports for vertical movement the knife blade 54 and this blade is adjusted vertically by means of a feed screw 55 which is carried by the frame 53. The opposite longitudinal edges of the frame 53 is provided with guide ribs 56 which are slidably fitted within the guide grooves 52. It thus can be seen that the frame can be slid longitudinally on the jaw 45 or transversely of the belt B.

The punch E is constructed similar to the belt cutter D and also includes a frame 60 which is provided with oppositely disposed guide ribs for slidably fitting within the guide grooves 52. This frame 60 is provided with a vertically disposed opening 61 in which is slidably mounted any preferred type of belt punch 63 which may be fed toward or away from the belt by means of a feed screw 64.

In operation of the improved tool, when it is desired to cut a piece of the belt therefrom for shortening the length thereof, the clamps F and G are arranged on the belt B in spaced relation to each other and on opposite sides of the usual laced connection of the ends thereof and the frame C is placed on the guide rod 29 and is slid longitudinally thereof until the knife blade 54 comes into alignment with the desired point. The feed screw 55 is then adjusted so as to move the blade 54 into engagement with the belt B and after the knife blade is adjusted into engagement with the belt B, the frame 53 is moved forcibly transversely across the belt which will effectively sever the same. It can be seen that the clamps F and G will firmly hold the belt ends against separation and the lever 38 is then operated so as to move the clamps F and G toward each other and when the belt ends come into engagement with each other the same are laced in the usual manner. Prior to the lacing of the belt ends, suitable holes may be formed in the belt at the point where the piece has been severed therefrom by means of the puncher E. When the puncher E is to be used the belt cutter D is removed from the frame C. This is accomplished by swinging the bolt 47 on its pivot and moving the belt cutter out of the guide groove 52. When the puncher E has been associated with the frame C it is merely necessary to turn the feed screw 64 so as to feed the belt punch 63 into engagement with the belt and the hole will be readily made therein. It can be seen that the frame 60 of the belt punch can be readily adjusted transversely of the belt so as to make the hole to the desired point transversely of the belt and the frame C can itself be adjusted longitudinally of the belt when it is desired to make another row of holes.

From the foregoing description, it can be seen that an improved and simple device has been provided, for effectively holding the bolt ends in position during repairs to the belt, such as the relacing of the ends thereof or the cutting of a piece out of a belt.

It also can be seen that the improved device can be effectively used during the insertion of a new piece into the belt so as to lengthen the same. When a new piece is to be added to the belt, the clamp is used in the same manner with the exception that the jaws F and G are moved away from each other so as to hold the belt at the desired point and the new piece is then inserted between the belt ends and laced to the belt ends in the ordinary manner.

Changes in details may be made without departing from the spirit or scope of this invention; but,

I claim:

1. A tool for facilitating repairs to transmission and drive belts comprising a pair of spaced clamps including adjustable jaws, means for adjusting the clamps toward and away from each other, and a frame slidably associated with the device for holding various belt tools.

2. A tool for use in connection with transmission and drive belts comprising a pair of clamps for engaging the belt at spaced points, means adjustably connecting the clamps together, a frame slidably mounted between the clamps for movement longitudinally of the belt, and a belt operating tool carried by the same and arranged for movement transversely of the belt.

3. A tool for use in connection with drive and transmission belts comprising a pair of clamping members arranged to engage the belt at spaced points, means adjustably connecting the clamps together, a sliding frame arranged between the clamps for movement longitudinally of the belt, a belt working tool carried by the frame and arranged for movement toward and away from the belt and movement transversely across the belt.

4. A belt tool comprising a pair of clamping members, means slidably connecting the clamping members together, means for adjustably connecting the clamping members, a frame slidably mounted between the members, a second frame slidably carried by the first mentioned frame for movement longitudinally of the frame, and a vertically movable tool carried by the second mentioned frame.

5. A belt tool comprising a pair of clamping members each including a pair of pivoted jaws, means for adjusting the jaws toward and away from each other, a pair of guide rods slidably connecting the clamping members together, means for adjusting the clamping members toward and away from each other, a movable frame arranged to engage the guide rods, and a belt working tool slidably and adjustably carried by said frame.

6. In a device for facilitating repairs to belts, a pair of clamping members arranged to engage a belt at spaced points, each of the clamping members including a pair of jaws, means connecting the jaws for swinging movement, and for permitting a limited vertical movement between the jaws, means carried by the jaws for adjusting the same toward and away from each other, rods slidably connecting the clamping members together, a bracket carried by each one of the clamping members, a rack bar carried by one of said brackets and slidably engaging the other bracket, and a pivoted lever carried by the last mentioned bracket, and spring pressed pawls carried by the lever and arranged to engage said rack bar.

7. In a belt tool, a frame including a pair of members arranged to engage the opposite sides of the belt, means for adjusting the clamping members toward and away from each other, one of said members including a pair of spaced bars, the bars having guide grooves formed on their inner faces, a frame arranged between said bars, outwardly extending ribs formed on the frame arranged to slidably engage in said guide grooves, a belt working tool slidably carried by the last mentioned frame, and a feed screw for raising and lowering said belt working tool.

8. In a device for facilitating repairs to belts, a frame including a pair of spaced guide rods, heads formed on the terminals of the guide rods, a pair of spaced clamps slidably mounted on the guide rods for movement toward and away from each other, and means for holding the clamps in various locked positions on said rod.

NEWTON J. McCAY.